United States Patent
Barrick et al.

[11] Patent Number: 5,990,834
[45] Date of Patent: Nov. 23, 1999

[54] RADAR ANGLE DETERMINATION WITH MUSIC DIRECTION FINDING

[75] Inventors: Donald E. Barrick, Redwood City; Belinda J. Lipa, Portola Valley, both of Calif.

[73] Assignee: Codar Ocean Sensors, Ltd., Los Altos, Calif.

[21] Appl. No.: 08/920,527

[22] Filed: Aug. 29, 1997

[51] Int. Cl.[6] ............................... G01S 3/52; G01S 13/00
[52] U.S. Cl. .......................... 342/418; 342/195; 342/445
[58] Field of Search .................................... 342/418, 443, 342/133, 378, 162, 432, 445, 195

[56] References Cited

U.S. PATENT DOCUMENTS

| | | | |
|---|---|---|---|
| H374 | 11/1987 | Abo-Zena | 342/378 |
| 3,882,506 | 5/1975 | Mori et al. | 343/728 |
| 4,172,255 | 10/1979 | Barrick et al. | 343/5 W |
| 4,433,336 | 2/1984 | Carr | 343/728 |
| 5,023,618 | 6/1991 | Reits | 342/128 |
| 5,262,785 | 11/1993 | Silverstein | 342/162 |
| 5,361,072 | 11/1994 | Barrick | 342/133 |

OTHER PUBLICATIONS

Schmidt, R., "Multiple Emitter Location and Signal Parameter Estimation," *IEEE Transactions On Antennas and Propagation*, vol. AP–34, No. 3, Mar., 1986, pp. 276–280.

Lipa, B., et al., "Least–Squares Methods for the Extraction of Surface Currents from Codar Crossed–Loop Data: Application at Arsloe," *IEEE Journal of Oceanic Engineering*, vol. OE–8, No. 4, Oct., 1983, pp. 226–253.

Lipa, B., et al., "Extraction of sea state from HF radar sea echo: Mathematical theory and Modeling," *Radio Science*, vol. 21, No. 1, pp. 81–100, Jan.–Feb. 1986.

Compton, R., "Two–Dimensional Imaging of Radar Targets with the Music Algorithm," Technical Report #719267–14, pp. 1–88, The Ohio State University, ElectroScience Laboratory, Dept. of Electrical Engineering, Dec. 1987.

*Primary Examiner*—Gregory C. Issing
*Attorney, Agent, or Firm*—Coudert Brothers

[57] ABSTRACT

An apparatus and method for target-angle determination using lower-frequency radars having compact non-moving antennas over broad viewing sectors. Use of direction finding (DF) in place of beam forming and scanning eliminates the need for conventional, physically large phased-array antenna systems. The described DF algorithm advances the art over previously described least-squares DF by allowing numerically efficient and robust resolution of multiple targets at closely spaced angles. When used with coastal HF ocean surface current and wave monitoring radars where sea echo is the target, the method extracts complex current patterns. The high degree of singularity of the antenna signal covariance matrix is exploited and used as the basis for extracting angles with minimal averaging. More receive antenna elements can be added at convenient locations to handle more complex target angle scenarios.

11 Claims, 1 Drawing Sheet

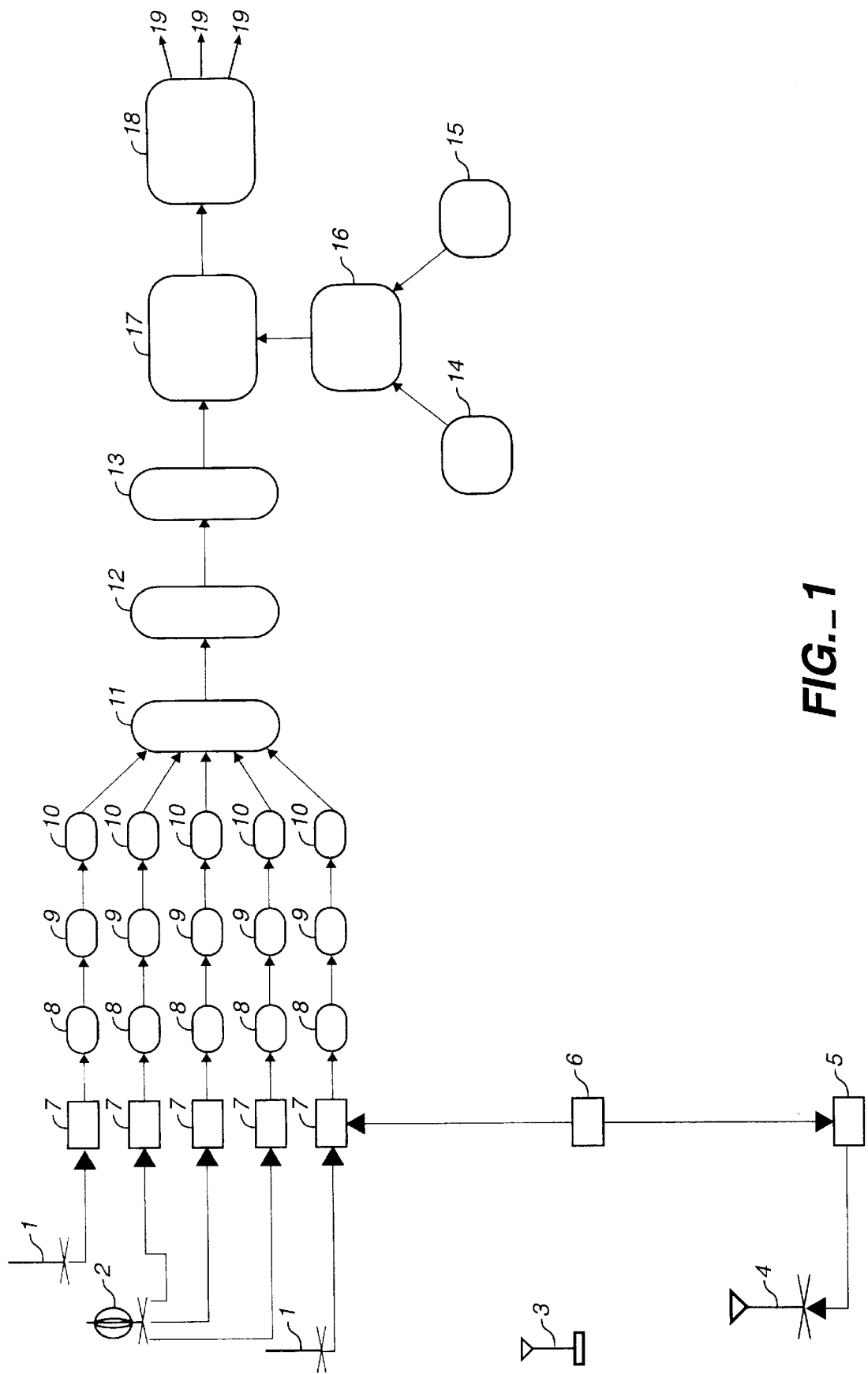
FIG._1

RADAR ANGLE DETERMINATION WITH MUSIC DIRECTION FINDING

TECHNICAL FIELD

The present invention relates to apparatus and methods for determining the angle of arrival of signals received by lower-frequency (below microwave) radars from multiple sources, and more specifically, to a method which utilizes an inventive direction-finding technique based in part on an algorithm called MUSIC to determine target angles from signals received by multiple-element antennas. This approach reduces the physical size of the antenna system compared to conventional phased arrays used for beam forming and scanning, and hence the cost of such systems.

BACKGROUND OF THE INVENTION

Lower-frequency radars, e.g., those operating in the MF, HF, and VHF bands, are useful for a number of applications. Among them are ocean surface current mapping and wave monitoring. Such radars are also well suited for detection of discrete targets, e.g., aircraft, ships, missiles, etc. Some advantages of such radars are:

(i) the ability to see beyond the horizon, in both skywave and surface-wave propagation modes;

(ii) the radar wavelength being of comparable size to scattering target dimensions, resulting in resonance with the target; and (iii) the lower data rates (resulting from the low frequency) of such radars permit easier digital signal generation and processing.

These lower-frequency radars typically operate at frequencies three orders of magnitude less than the much more common microwave radars. The disadvantages of such low frequency radars compared to microwave radars primarily arise from the larger antenna sizes required in order to achieve pattern gains comparable to that of microwave systems. This is because the antenna sizes can be as much as three orders of magnitude larger than those required for microwave radars. A disadvantage of this antenna size requirement is that the antennas become prohibitively costly or too impractical for most applications. In contrast, if the antenna size is reduced, standard beam forming techniques provide very poor target angle resolution. In addition, inadequate target detection sensitivity can result due to the lower antenna gain.

Thus, one is faced with a decision: either incur the cost and difficulties of building a large antenna to obtain the target resolution and sensitivity afforded by the use of beam forming techniques and the high antenna gain, or utilize a smaller antenna and accept the resulting degradation of resolution and antenna gain.

A standard method by which a microwave radar determines target direction is to form a narrow beam. Location of a target within the beam places a constraint on the direction of the target, i.e., it must fall within the angular region defined by the beamwidth. This is why a narrow beam is so desirable: it reduces the uncertainty concerning the direction of the target. However, a high degree of angular resolution (i.e., a small beamwidth) is possible only when the antenna aperture is many wavelengths in extent. This is because the beamwidth (in radians) is on the order of the radar wavelength divided by the aperture dimension. As a result, when beam forming techniques for direction finding are used with HF skywave radars, phased array antennas several kilometers in length are required. Narrow-beam surface-wave radars, such as the British OSCR used for ocean current mapping use phased array antennas that require more than 100 meters of lineal coastal access, a frequently impractical constraint. HF antennas with size on the order of a wavelength (e.g., 10–20 meters) have nearly omni-directional patterns, and are considered inadequate for accurate radar angle determination if beam forming and scanning are employed due to their limited angular resolution.

An alternate way to determine the direction angle of a target is to employ direction-finding (DF) principles. In DF, the signals from the individual antenna elements are processed using an algorithm that estimates the angle(s) of arrival. In beam forming/scanning, the signals from the separate elements are combined to form and scan a beam; the estimated target angle then corresponds to the beam position where the combined signals are a maximum. However, this technique has rarely been used with radars. When antenna sizes are manageable, as they are at microwave wavelengths, beam forming/scanning is preferred to DF because it offers greater sensitivity for a given angular accuracy.

U.S. Pat. No. 4,172,255 describes a three-element HF radar receive array with half-wavelength inter-element spacing and gives a closed-form DF algorithm for mapping ocean surface currents. U.S. Pat. Nos. 3,882,506, 4,433,336, and 5,361,072 describe HF radar hardware implementations of two crossed single-turn air-loops and a monopole all mounted along the same axis. This forms a very compact antenna system. The latter three-element antenna configuration has been used with both a closed-form algorithm (where the loop signals are proportional to the sine and cosine of the bearing), and with a least-squares algorithm that searches for the optimum bearing angles by finding the minimum between a model for the signals received by the antennas and the actual measured data.

However, a disadvantage of the least-squares method is that the bearing is a nonlinear function of the measured/model signal amplitudes, so that a numerically inefficient search algorithm is required. When used to determine more than two bearings, this multi-dimensional grid-search process is prohibitively inefficient for use in real-time digital radar signal processing applications. Another disadvantage is that the least-squares algorithm does not allow for a robust, objective hypothesis-testing method to determine the number of signals at the same frequency from different bearings. This is because the required data covariance matrix among the antenna signals is nearly singular.

MUSIC (for MUltiple SIgnal Classification) is a direction-finding algorithm described in the article entitled "Multiple Emitter Location and Signal Parameter Estimation", by Ralph O. Schmidt, *IEEE Transactions on Antennas and Propagation*, vol. AP-34, no. 3, March, 1986. The algorithm has found usage in the signal intelligence gathering community, where it is used to determine the directions of non-cooperative radio emissions. In most such applications, antennas connected to separate receive channels are placed at convenient locations on the body of aircraft or ships. From the received signals, the algorithm locates the angles of arrival with respect to the vessel. The MUSIC algorithm has been used for locating the time delay of radar targets in the process of forming two-dimensional images for radar cross section ranges. However, the algorithm has not been used in radar applications for target angle determination, where beamforming/scanning has by far been the preferred approach for obtaining target direction. One reason for this preference is that the MUSIC algorithm requires signals that decorrelate rapidly, so that multiple target angles can be resolved; hard target signals normally do not have this property.

BRIEF DESCRIPTION OF THE DRAWING

FIG. 1 is a block diagram showing the hardware components and signal processing stages of the radar angle determination apparatus and method of the present invention.

DETAILED DESCRIPTION OF THE INVENTION

The inventors of the present radar angle determination apparatus and method have recognized that the MUSIC algorithm, in conjunction with certain additional features of the present inventive method, has considerable advantages over other DF algorithms that have been used with lower frequency radars. These include an increase in target angle determination accuracy and robustness. This is accompanied by computational efficiencies for a given compact antenna size and leads to system cost reductions compared to available alternatives.

In the radar application considered by the inventors (mapping of surface ocean waves), the transmit antenna illuminates the desired field of view all at once, in many cases covering 360° of space (i.e., omni-directional). Use of the MUSIC algorithm for direction finding with such an antenna, in conjunction with the other features of the present invention which will be described, offers the following advantages over currently used DF methods, such as closed-form and least-squares, which are less robust and more computationally intensive when applied to lower-frequency radar signals:

(i) providing the most accurate target angle estimates for a given number (N) of receive antenna elements;

(b) providing a computationally efficient method which eliminates the multi-dimensional nonlinear grid-search of the least-squares DF algorithm;

(c) providing a robust, objective hypothesis test that can be used to determine how many signals at the same frequency come from different bearing angles; and (d) being able to accommodate additional receive antenna elements with diverse patterns, which may be arrayed in convenient geometries that conform to radar site constraints, in contrast, for example, with conventional phased arrays that must lie on a straight line parallel to a straight level coast. The additional elements, along with the accompanying receiver channels, can be added to handle more complex target-angle scenarios and/or to yield correspondingly better angle accuracies.

A principal obstacle overcome by the present invention is the limited target angle accuracy typically obtained with compact receive antenna systems, and their ability to resolve multiple-angle signals. By allowing the addition of one or two more elements as required (placed in convenient locations), it is possible to resolve more angles with greater accuracy.

FIG. 1 is a block diagram showing the hardware components and signal processing stages of the radar angle determination apparatus and method of the present invention. It is noted that blocks shown as sharp-cornered rectangles in the figure represent hardware components. The rounded-corner rectangles represent the key signal processing steps performed on the received radar data, and would typically be executed by a software program running in real time on a digital computer.

At the far left of the figure are antenna elements 1. The right most arrows 19 refer to the outputs that embody the goal of this invention: the M different target angles obtained at each signal frequency and target range. It is noted that signal amplitude data is included with these M signals. The output may be presented in the form of a continuous polar map (range vs. angle) of target echo radial velocity, which is a typical output from beam forming/scanning radars. Typically, when direction finding techniques are used for a situation in which emitter signals from only one or two bearings are present, a polar map is not a meaningful representation. Thus, the use of direction finding techniques as part of the present invention provides an output similar to that of conventional beam forming/scanning systems without the expense and size of the phased array antenna systems required at HF/VHF frequencies for such systems.

Radar System Hardware and Spectral Processing

The radar system hardware includes a signal generator 6 for producing a synthesized signal. This signal is amplified by a suitable amplifier 5 and radiated through the transmit antenna 4. Transmit antenna 4 has a broad-beam pattern (such as a monopole), so that the angular field of view desired for the radar is floodlighted simultaneously with radiated illumination.

The receive elements of the radar system include N antenna elements, each having also a broadbeam pattern. FIG. 1 illustrates this with five elements (N=5); three comprise a collocated set of two crossed loops and monopole 2, augmented by two separate monopole elements 1 positioned at convenient locations. The signal from each receive antenna element is provided to its own identical receiver channel 7. Time multiplexing could allow all N elements to pass through a single channel, at the expense of less total received signal energy (by a factor of N). Receivers 7 are typically a standard receiver module that downconverts frequency using the transmit signal from 6 to a convenient final value near baseband that is then digitized. Hence, the output of receivers 7 are a digital time series that is to be processed to retrieve the target information. A preferred design for the receivers employs separate parallel receive channels rather than time-multiplexing the N antenna signals through a single receiver channel. This is because, as noted, the latter approach reduces the available signal-to-noise ratio by a factor of N.

In the radar system described in the U.S. Pat. No. 5,361,072, the first stage 8 of the digital signal processing is target range determination; its output is a time series of radar echo and noise for each range cell. The next signal processing stage 9 is Doppler processing, sometimes referred to as coherent integration or processing. At its output, potential targets fall into a two-dimensional space of range and Doppler frequency. The final processing stage 10 prior to target angle determination is to identify targets and segregate these from undesired background and noise. It is these targets whose angles are to be found in accordance with the method of the present invention.

An additional system hardware feature may be included in some embodiments: an antenna and receive channel calibration module. This employs a stand-alone portable transponder 3, moved to known locations, that re-broadcasts the transmit signal so that when received, it is easily identified above the noise. This is employed to measure the individual antenna patterns for the N elements, as well as the receive channels' amplitude and phase imbalances. This measurement procedure is referred to as calibration, and the pattern data are stored digitally 14 for use in the direction finding angle extraction process.

Target Angle Determination Using the Inventive Method

Application of the direction finding technique of the present invention to the radar data begins with stage 11. In this processing step, the complex digital signal voltages from each of the "i" antenna elements, denoted by $v_i(r_m, f_n)$ for signals in the m-th range cell at range $r_m$, and at the n-th Doppler frequency cell at $f_n$, are combined to form cross products. This means that, after a given Doppler/integration period, a set of N×N elements are formed (representable as an N×N square matrix) whose (i,j) th element is $[v_i(r_m, f_n), v_j*(r_m, f_n)]$, where "*" denotes the complex conjugate operation. This quantity is the cross product (conjugate sense) or covariance matrix between the received signal from the i-th and the j-th antenna elements. Thus, a single-sample cross-product matrix has complex conjugate (Hermitian) symmetry. Note that the signals used to form this matrix contain the target signal information, and also noise and other background clutter.

The complex cross product samples are then averaged. Normally, noise voltage signals are modeled as Gaussian random variables. In the case where the target is sea echo, the echo voltage itself is a zero-mean Gaussian random variable; in the case of a discrete or "hard" target, only the noise and/or clutter may be random, although the signal from moving targets sometimes varies in a random manner. In any event, from one integration period to the next, the signals from sea echo targets are uncorrelated or independent (although this is not a requirement for using the present invention).

This is an important point. The sea echo target signals are random variables that decorrelate rapidly over angle and time. For example, the radar echoes from different angle bearing bins only 50° apart are uncorrelated. Similarly, echoes from consecutive time periods separated by more than 20 seconds have been found to be uncorrelated. The uncorrelated nature of the received echoes is an important aspect of the direction finding method of the present invention: if the signals do not decorrelate over an appropriate timescale, then a proper average of the covariance matrix cannot be formed. The lack of decorrelation of the received signals has presented a problem when applying the MUSIC algorithm for direction finding in the situation of deterministic (non-random) signals, especially where multiple signals having the same frequency arrive from different bearings. If the multiple signals do not decorrelate so that an average can be taken, then only one signal can be resolved using the algorithm. To overcome this limitation, one investigator developed an artificial method of randomizing the data in order to obtain an adequately averaged covariance matrix. However, this randomizing approach did not perform well enough to be used for an operational system.

Returning to the present invention, if L such consecutive cross products are averaged together over time, the result is referred to as an L-sample covariance matrix. This averaging is performed in step 12 of the figure, and each of the N×N terms may then be written $<v_i(r_m, f_n) v_j*(r_m, f_n)>_L$, or $<v_i v_j*>_L$ for short. The number of samples, L, used in the averaging stage is determined by considering the tradeoff between the degree of algorithm robustness and the nature of the radar application. It has been shown that too few samples may make it more difficult to separate several signals at different bearings, but averaging too long in some applications (e.g., military target identification) may leave inadequate time for response or defense measures.

The next stage 13 in the signal processing is the eigen-analysis decomposition of the sample-averaged data covariance matrix. This step may be better understood by considering the makeup of the individual voltages, $v_i$, which comprise the raw covariance matrix formed in stage 11 of the processing. These values contain linear combinations of target signals, background clutter, and noise, all of which are mutually independent or uncorrelated. Because they are combined together, the voltages $v_i$ on the N antenna elements, are correlated. If only one non-random target signal were present (no clutter or noise), then the N×N covariance matrix would contain only one piece of independent data, and hence would be singular with "rank one". The eigen-analysis essentially separates signal and noise/background space into N eigenvectors, all of which are uncorrelated and mutually orthogonal. The eigen-analysis processing can be performed by one of many such available subroutines, which are standard in most computer libraries.

The meaning of the eigen-analysis is that eigenvectors associated with the M highest accompanying eigenvalues correspond to the stronger target signals from different angle directions, while the N–M lower-valued eigenvalues identify the noise eigenvectors. In the absence of noise/clutter, the non-target eigenvalues will be identically zero, meaning the matrix is truly singular.

As noted previously, the actual or near singularity of the antenna data covariance matrix presents a problem when applying some direction finding techniques, such as those based on a maximum-likelihood least-squares algorithm. Since the covariance matrix is actually or nearly singular, it cannot be inverted. This prevents effective and objective hypothesis testing to determine the number of signals at the same frequency coming from different bearings.

A subset, M' (out of the possible number of target bearings, N–1, where N is the number of antenna elements), of bearing target angle candidates are determined in stage 17. Shown under block 17 are blocks 14 and 15, containing either the N measured antenna element patterns (14) or idealized representations of these antenna patterns (15). The latter may be used in lieu of calibration measurements if they are considered adequate and reliable. In processing stage 16, these antenna patterns are combined into model covariance vectors, representing M' signals from M' different, candidate angles. Note that M' must be less than N–1, where N is the number of antenna elements. The M' model covariance vectors form the inputs for processing stage 17, along with the data eigenvectors received by the radar. It is shown in the MUSIC algorithm formulation that even the M' model covariance vectors are orthogonal to the N–M' noise eigenvectors (meaning their inner products are zero) when the angle of the model eigenvectors corresponds to a true target direction.

In order to determine the bearing angles of the targets, the angles of the model covariance vectors are stepped incrementally through the field of view, searching for zero, i.e., the orthogonality condition between the model covariance vectors and the eigenvectors determined from processing stage 13. The M' bearings and corresponding signal amplitudes and eigenvalues are then output from stage 17 to stage 18.

Note that at this point, one still does not know the correct value of M, namely, how many target signals have come from different angles. One approach to resolving this problem is to begin with M'=1, and repeat stage 17 up to M'=N–1, beyond which point the system runs out of noise eigenvectors with which to search for bearings. For the example shown in the figure where N=5 antenna elements, the number of different possible signals and bearings (at a given range and Doppler frequency) would correspond to M'=1, 2, 3, or 4.

Stage 18 tests hypotheses to determine the number, M, of signals of the M' candidates that best fit the data. For example, if two of the eigenvalues are orders of magnitude higher than all the N–2 others, so that latter can be identified as noise, then clearly the answer would be M=2. In practice, the breakpoint is usually not so clear. Standard chi-squared and F-tests are objective, and have been used in other hypothesis-testing applications, but have not yet been successfully demonstrated when applying MUSIC to real data. Assuming a correct selection has been made, the outputs from stage 18, therefore, are the M bearings 19 associated with target signals from range cell (m) and Doppler frequency (n). It is also possible to output statistical uncertainties (error estimates) associated with each of these M angles.

One investigator has utilized a chi-squared hypothesis testing technique that examines only the eigen-analysis properties of the covariance matrix to determine how many signals are present, and then determines the bearings and amplitudes for those signals. This method is described in the previously referred to paper by Schmidt. However, the present inventors have realized that this approach does not work adequately for sea echo signals. This is because one needs to know the amplitudes of the signals from the different directions to determine the number of true target signals, and these amplitudes are only available after the bearings are determined. In the processing scheme described with reference to FIG. 1, the possibility of N−1 signals (with N being the number of antennas) is permitted, with the corresponding signal bearings and amplitudes being determined for each of the M' possible signals. After generating the signal bearings and amplitudes, that information is tested against the data based on the relative amplitudes of the N−1 sea echo signal amplitudes and the relative amplitudes of the covariance matrix eigenvalues.

Detailed Example of Application of Inventive Method

A detailed example of how the inventive method is applied will now be given. This description elaborates the processing stages previously described with reference to FIG. 1.

The Sensor Model Vectors: A given receive antenna system can be described in terms of a (complex) vector whose length N is the number of receive antennas. Its elements are known functions of θ, the bearing angle: known a priori either from theory or from measurement, e.g., calibration with a transponder. These model vectors can be used in stage 16 of the method shown in FIG. 1.

For example, for a co-located crossed-loop/monopole antenna system with perfect patterns where the amplitude/phase mismatch factors have been removed (neither of which assumption is necessary), this vector becomes:

$$[a_1(\theta)a_2(\theta)a_3(\theta)]^T = [\cos\theta\ \sin\theta\ 1]^T = [a_1]^T$$

for $1 \leq n \leq 3 (N=3)$.

For a linear array of N equal spaced elements 'd' apart, this becomes:

$$[a_n]^T = [1 e^{ikd\sin\theta} e^{i2kd\sin\theta} \ldots e^{inkd\sin\theta} \ldots e^{i(N-1)d\sin\theta}]^T = [e^{i(n-1)kd\sin\theta}]^T$$

for $1 \leq n \leq N$.

A synthesis of the above two representations is possible, and the sensor model vector is then made up of the appropriate combination of the selected elements.

Response to M Signals from Different Bearings. Each antenna sensor element responds linearly to M signals from M bearings; i.e., its output is the sum of these responses. Assume the signal from the m-th direction $\theta_m$ has a complex amplitude $s_m$. Then the voltage matrix from the system can be written as an N-column vector formed from the multiplication of the rectangular N×M sensor model matrix by the M-column signal matrix (using the crossed-loop/monopole system for this example):

$$\begin{bmatrix} V_1 \\ V_2 \\ V_3 \end{bmatrix} = \begin{bmatrix} a_1(\vartheta_1)a_1(\vartheta_2) \\ a_2(\vartheta_1)a_2(\vartheta_2) \\ a_3(\vartheta_1)a_3(\vartheta_2) \end{bmatrix} \begin{bmatrix} s_1 \\ s_2 \end{bmatrix} \quad (1)$$

Here, it is implied that N=3 and M=2. It can be shown in general that any direction-finding system can only determine up to N−1 signal directions uniquely, i.e., M≦N−1 for a solvable system. Note that the signal vector $[s_m]$ can have as its complex elements non-random amplitudes, or random elements drawn from an ensemble (e.g., at different times). Total Response Including Noise: Noise is any error that can be expressed as an additive term, representing a departure of the sensor signals from perfect. It can therefore include external (atmospheric) noise; internal noise; quantizing error in the A/D converter; errors incurred in representing infinite-ensemble averaging by a finite set of samples; and finally, errors in our modeling of the system (hardware and sea-scatter/current interaction process). In any case, it is another N-column vector that is added to the signal data to give (italics includes noise; block does not):

$$[v]=[v]+[n]=[a][s]+[n]$$

The Covariance Matrix: The signal consists of complex, zero-mean random voltages. Its covariance matrix (corresponding to stage 11 of FIG. 1) is formed as the square, Hermitian (meaning it has conjugate symmetry about its principal diagonal) transpose product matrix of the voltage vector:

$$[\Phi]=[v][vP^*]^T.$$

With noise present, it becomes:

$$[\Phi]=<[a][s][s^*]^T[a^*]^T>+<[n][n^*]^T>=[a]<[s][s^*]^T>[a^*]^T+<[n][n^*]^T> \quad (2)$$

where it is assumed that the noise is not correlated with the signal vectors. This is a reasonable assumption and one the inventors have found applicable for sea echo data. Here, < . . . > denotes an infinite ensemble average. In the absence of noise, the covariance matrix becomes:

$$[\Phi]=[a]<[s][s^*]^T>[a^*]^T \quad (3)$$

It is noted that the meaning of averaging and covariance is arguable especially in the case when the 'signal' is not random (e.g., discrete targets).

Random Signals. In the case where the infinite ensemble average (without noise) is formed from signals $[s_m]$ that are random, it can be shown that the average covariance matrix $[\Phi]$ is singular, of rank M (M=number of signals from different directions). Because it is singular it obviously cannot be inverted. The meaning is clear: combinations of two signals received at three sensors produce a system of equations (3×3) that are not independent, but rather, are linear combinations (rows and/or columns) of each other. In the case of two signals (M'=2), diagonalizing the covariance matrix (finding its eigenvalues and eigenvectors) will produce only two non-zero eigenvalues (and corresponding non-null eigenvectors).

When noise is added but the signal matrix is still random, the covariance matrix $[\Phi]$ is not quite singular. For M'=2, it will produce two large eigenvalues very close to those obtained with no noise present, with the remaining eigenvalues being small (for high signal-to-noise ratios). If only one signal is present, there will be only one large eigenvalue because the covariance matrix rank in the absence of noise is M'=1.

Non-Random Signals. When the signals $[s_m]$ are non-random from sample to sample, there is no averaging going on in the absence of noise. In this case, the rank of the covariance matrix is always unity. To understand why, consider that the two signal-vector sums (for signals from two different directions $\theta_1$ and $\theta_2$) form voltages that could have been produced by a single signal from a third direction, $\theta_3$. When noise is included, its averaged covariance term is added to the former matrix, but the overall covariance matrix still has only one large eigenvalue even though multiple signals may have been present.

Diagonalization and Obtaining the Signal Matrix: For a two-angle case (M=2), each of the antenna voltages is a linear combination of the two signals and the noise. Diagonalization (corresponding to the eigen-analysis of stage 13 of FIG. 1) separates the covariance matrix of equations into an orthonormal set. Note however that the center 2×2 average signal matrix is diagonal, i.e., $$\langle [s][s*]^T \rangle = \begin{bmatrix} \langle s_1 s_1^* \rangle & 0 \\ 0 & \langle s_2 s_2^* \rangle \end{bmatrix} = \begin{bmatrix} S_1 & 0 \\ 0 & S_2 \end{bmatrix} \quad (4)$$

because the off-diagonal elements $s_1 s_2^*$ average to zero since they are uncorrelated. Hence, it is the antenna model matrix of the two signals (obtained as discussed from stage 16 of the figure) pre- and post-multiplying the core signal diagonal matrix that makes the covariance matrix non-diagonal, which the eigenfunction transformation remedies.

Sticking to the example of M=2 (although this works for M arbitrary but equal to or less than N−1), note that when equation (3) is diagonalized, it can be written:

$$[\Phi][e_s] = [e_s] \begin{bmatrix} \lambda_1 & 0 \\ 0 & \lambda_2 \end{bmatrix} \quad (5)$$

where the signal covariance matrix $[\Phi]$ was 3×3. Each of the two signal eigenvectors corresponding to the two non-zero eigenvalues $\lambda_1$, and $\lambda_2$ is 3×1 and so the signal eigenfunction matrix $[e_s]$ is 3×2. Hence equation (5) is a 3×2 matrix.

Now, pre-multiply by the signal eigenfunction matrix transpose (understanding transpose to be complex conjugated), and expand the signal covariance matrix $[\Phi]$ to obtain:

$$[e_s]^T [a] \begin{bmatrix} S_1 & 0 \\ 0 & S_2 \end{bmatrix} [a*]^T [e_s] = [e_s] \begin{bmatrix} \lambda_1 & 0 \\ 0 & \lambda_2 \end{bmatrix} = \begin{bmatrix} \lambda_1 & 0 \\ 0 & \lambda_2 \end{bmatrix} \quad (6)$$

Note that the matrix defined by equation (6) above is 2×2 (because M=2). Now, define the following signal model-times-signal eigenfunction matrix (2×2) as:

$$[G] = [a*]^T [e_s]; [G^T] = [e_s]^T [a] \quad (7)$$

The diagonal signal intensity matrix for the two-signal case (M=2) becomes:

$$\begin{bmatrix} S_1 & 0 \\ 0 & S_2 \end{bmatrix} = [G^T]^{-1} \begin{bmatrix} \lambda_1 & 0 \\ 0 & \lambda_2 \end{bmatrix} [G]^{-1} \quad (8)$$

The meaning of this result, and how to determine the amplitudes of the two signals (if indeed there are M=2 signals), is explained in the next section. Recall that all eigenvectors, by definition, are orthonormal to each other. When noise is present, the third eigenvalue, $\lambda_3$, will no longer be identically zero, but will be small. Its associated eigenvector (which we set to zero above) is still orthogonal to the signal eigenvectors associated with the M largest eigenvalues. It is important that all three are orthogonal, because it means that—in the exact meaning of the diagonalization—noise space and signal space no longer overlap nor are mixed up (linearly) with each other as they were in the beginning.

Obtaining the Signal Bearings: With this background, the MUSIC algorithm is used to derive solutions for bearing by removing the M' eigenvectors associated with the signals, leaving a noise eigenvector matrix $[e_N]$. For example, if there is one signal from one direction (M'=1) but three antennas (N=3), then $[e_N]$ would be a 3×2 rectangular matrix. If M'=2 (dual-angle case), then $[e_N]$ is a 3×1 column vector. A general description of the process (which corresponds to stage 17 of FIG. 1) is as follows:

(i) Construct the sample covariance matrix $[\Phi]$, i.e., the Hermitian square matrix from the sample-averaged cross spectra formed in stage 12 and stored;

(ii) Diagonalize this and order the eigenvalues/eigenvectors from largest to smallest (1, 2, 3);

(iii) For the M'=1 trial, retain the (2, 3) eigenvectors associated with the smallest two eigenvalues and arrange them in the 3×2 rectangular matrix $[e_N]$ as columns;

(iv) For the M'=2 trial, retain the (3) eigenvector associated with the smallest eigenvalue to form a 3×1 rectangular matrix (vector) $[e_N]$;

(v) For each of these trials, form the simple scalar variable F, stepping over a precalculated grid of bearing angles, $\theta_j$ (say every 0.5°):

$$F(\theta_j) = [a(\theta_j)]^T [e_N][e_N]^T [a(\theta_j)]$$

The terms $[a(\theta_j)]$ in equation (9) are formed as described in the previous section entitled "The Sensor Model Vectors";

(vi) Plot the inverse $F^{-1}(\theta_j)$ vs $\theta_j$ and find the M' maxima. For the first trial (where M'=1), there is guaranteed to be one maximum. For the second trial (M'=2), there are guaranteed to be two maxima. These are the MUSIC derived solutions for the bearing angles; and (vii) Determine the M' signal amplitudes corresponding to the M' signal bearing angles determined in the previous step. This is done by solving equation (8) using the M' signal eigenvectors $[e_s]$ and antenna sensor model vectors $[a]$ via equation (7).

Meaning of this Process: The explanation of why this is a physically reasonable and optimal solution to the problem is the following. The M' eigenvectors $[e_s]$ that were associated with the 'signals' are produced by linear combinations of the M' signals Sm in the received antenna voltages $[v_n]$. The diagonalizing process (by definition) makes the signal eigenvectors $[e_s]$ orthogonal to all noise eigenvectors $[e_n]$. Since the signal eigenvalues $[\lambda_m]$ are linear combinations of the $S_m$ (see equation (6)), the noise eigenvectors, $[e_N]$ are also orthogonal not only to the signal eigenvectors $[e_s]$, but also to the antenna vectors $[a_m]$ due to these M' signals. Hence, whenever $\theta_j$ passes through one of the M' signal bearings $\theta_m$, the function $F(\theta_j)$ goes to zero due to the orthogonality with the noise eigenvectors remaining in $[e_N]$. Its reciprocal, $F^{-1}(\theta_j)$, therefore, goes to infinity (or in reality, has sharp maxima) at these bearing solutions $\theta_m$, for a total of M' maxima. The number of these maxima is dictated by the 'trial', i.e., how many eigenvectors were removed from the eigenfunction matrix to leave $[e_N]$, which is associated with the noise.

How Many Angle Solutions Are There (What is M)? The above arguments make sense if M is known: the number of signals from different directions. In the standard implementation of MUSIC discussed in the Schmidt article, M was determined based solely on an analysis of the results of the eigen-analysis performed at stage 13. of FIG. 1. However, as has been noted, the inventors of the present invention have realized that the standard method is not accurate for the processing of sea echo data.

Instead, in accordance with the present invention, in stage 18 the hypothesis testing aspect of the inventive method is used to determine M. The inventors have determined that a sufficiently accurate and robust method of determining the value of M can be obtained by the following approach. In order to satisfy the hypothesis (pass the test) that there are M signals present from M directions, the following three test are used and must be passed. Otherwise, the hypothesis of M signals is rejected and the M–1 hypothesis is tested.

(1) After rank-ordering the covariance matrix values, the ratio between the largest and Nth (or smallest) cannot exceed a predetermined level, e.g., 20:1;

(2) After rank-ordering the candidate signal amplitudes, the ratio between the largest and the Mth (or smallest) cannot exceed a given level (which is less than that for the eigenvalue test), e.g., 10:1; and (3) The structure of the M×M signal covariance matrix must be nearly diagonal (highly positive definite), e.g., for M=2, the product of the diagonal elements must exceed products involving the off-diagonal elements by a ratio of greater than 3:1.

Note that the ratio of values given above may be varied depending upon the actual application and signal environment. The values given are for purposes of example only, and are meant to illustrate a set of values which the inventors have found useful.

Returning to the results of the processing steps performed prior to stage 18, the bearing angles determined were based on both M'=1 and M'=2, as trials. Step (1) of the above-described hypothesis testing is then performed. Then, from the M'=2 trial, two values of $\theta_1$ and $\theta_2$ are obtained. These are then used to form the 3×2 matrix $[a_m]$ shown in equation (1). With this, the two candidate signal intensities are obtained from equations (7) and (8). Now, according to step (2) of the hypothesis testing described, it is necessary to decide whether the smaller, say $S_2$, is that much less than $S_1$ that it can be considered 'noise' rather than signal. A value established over the years as a reasonable 'threshold' was $\frac{1}{10}$, i.e., if $S_2 < S_1/10$, it is considered noise, and it is decided that M=1, i.e., it is a one-angle solution. If this step indicates that two candidate signals from different directions are present, then step (3) of the hypothesis testing is performed. If all three of the hypothesis testing steps are passed, then the value of M=2 is selected.

Note that the preceding example is for a three-antenna system (i.e., the antenna system described in the '072 patent where N=3, and M=2 at most). It should be readily apparent how to extend this method in a straightforward manner as more antenna elements are added (N=4, 5, 6) and then trials for M=3, 4, and 5 are included as possibilities and tested.

Practical Measurement of the Covariance Matrix: When the 'signals' are not random, a great deal of attention has been paid to how one forms a practical covariance matrix for use with MUSIC, that reflects a rank equal to the number of signals.

However, this is not a problem when using the antenna and processing system described herein. The proper covariance matrix to use is already being calculated with the antenna system: the L-sample-averaged cross spectra. If an entire hour's data are to be used with the system where cross spectra are formed every 256 seconds, then L=14. The data is written hourly to disk and then put into Hermitian matrix form at each Doppler (radial velocity) point to obtain:

$$[\Phi]_L = \left\langle \begin{array}{ccc} v_1 v_1^* & v_1 v_2^* & v_1 v_3^* \\ v_2 v_1^* & v_2 v_2^* & v_2 v_3^* \\ v_3 v_1^* & v_3 v_2^* & v_3 v_3^* \end{array} \right\rangle_L$$

This corresponds to the averaging process described with reference to stage 12 of FIG. 1. It appears advantageous to use shorter time periods, with less samples than L=14, to reflect real changes in ocean conditions, perhaps sacrificing some stability in the covariance averaging process. An even more desirable reason (assuming only statistical changes happen over shorter periods) is to have more radial velocity points because the DF processing happens at more frequent intervals. This tends to fill in bearing gaps in coverage when more radials are available for averaging. The investigations of the inventors show averages of three consecutive 256-second cross spectra are best (L =3), with overlap on the last/first elements of consecutive series.

Application-Specific Algorithm Configuration An important aspect of the radar signal processing method of the present invention should be noted. This relates to whether the 'target' is a discrete body (e.g., an aircraft, ship, missile, etc.) or a continuous target, like sea-surface echo. For example, most HF radars today are built and commercially sold to map ocean surface currents and waves, and therefore deal with continuous targets of the latter category.

In the case of hard targets, it is very rare that more than one target at exactly the same range and Doppler frequency (radial velocity) will be present at different angles. Hence, one can normally assume M=1, and thus employ only the single eigenvector associated with the largest eigenvalue of the covariance matrix. In this case, all of the other eigenvalues/eigenvectors are assumed to represent noise. If it is suspected this is not the case, and that there may be multiple targets (at the same range and Doppler), then special measures must be used in calculating a sample-averaged covariance matrix. The reason is that hard target echoes are not random variables, so that averaging does not increase the rank of the covariance matrix beyond unity. For example, the rank must be at least two in order to robustly extract both angles if two targets are present. If the target echoes do not vary randomly, becoming independent of each other over the averaging time, then the dominant eigenvalue will be much greater than the others, meaning the rank is close to unity. In such cases, as has been noted, application of the MUSIC algorithm has required cumbersome and non-robust methods to 'pseudo-randomize' the covariance matrix, with the performance of such methods being unpredictable. However, if one is confident that one is dealing with a single-angle situation (M=1), then it is not necessary either to average or to randomize the covariance matrix. In such a case, one can work with a sample average of one (a single cross product matrix).

On the other hand, as the inventors of the present invention have realized, a continuous sea-echo target complex is ideally suited to using the combination of the MUSIC algorithm and the additional steps of the present invention, which includes the averaging process. In this case, the target echo is randomly varying, decorrelating sufficiently over consecutive sample periods. The inventors have determined that covariance averages of only three samples are adequate for use with the present invention, even in dual or triple-angle cases (M=2, 3). This is important for HF radar ocean-surface current mapping, because target distributions with angle often consist of M=1, 2, or frequently 3 values, unlike hard target applications where M=1 is the usual situation. Mapping quality will degrade if the correct number of angles is not extracted, and therefore the inventors have demonstrated that the processing method described herein has great advantages over conventional techniques for this application.

Application of the processing method of the present invention to radar angle determination overcomes many of the inconveniences of the large beam forming and scanning antennas of lower-frequency radars (MF/HF/VHF). In addition, use of the described processing algorithm solves several problems inherent in the DF methods utilized in prior angle determination methods. These include:

(i) the requirement to search numerically in multi-dimensional space to find target angles, an impossibly cumbersome process to do in real-time processing when the number of angles or dimensions exceeds three;

(ii) the task of deciding objectively how many targets at different angles are present in the received radar data, when noise and clutter is present;

(iii) an angle-extraction foundation that builds on the inherently singular nature of the target covariance matrix, rather than attempting to circumvent this fact; and (iv) the random sea echo signal distribution and its multiple-valued nature as a function of bearing angle, properties that are inherent in lower-frequency coastal ocean-current and wave mapping radars. Such randomness has often led to significant errors, for example, in closed-form DF algorithms.

The use of the processing algorithm discussed permits the flexibility of adding additional receive antenna elements to the radar system in order to resolve more complex angular distributions of targets. The additional elements need not be arranged in a pre-ordained manner (as is the case when using linear phased arrays), but can be configured to accommodate local site constraints. Finally, the computational burden of the added elements is not a significant part of the overall radar processing, as it was with the previously used DF methods (e.g., the least-squares algorithm).

Although the description above contains many specificities, these should not be construed as limiting the scope of the invention. Instead, they are to be considered as examples of presently preferred embodiments thereof. For example, although FIG. 1 shows five receive elements that can resolve up to four target angles, more or less elements employing the same principles can be used as the application complexity dictates. In addition, mention was made of application of this radar algorithm to HF radar ocean current mapping, but the invention can also be applied to many other radar areas, including hard target detection, wind profiling, etc.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

We claim:

1. A method of processing radar data to determine the angles of arrival corresponding to a plurality of received signals, comprising:

acquiring the plurality of signals, each of the plurality of signals representing a random variable that decorrelates over angle and time with respect to the others of the plurality of signals;

converting each of the plurality of signals to a time series for each of a plurality of range cells;

doppler processing the converted signals;

processing the doppler processed signals to segregate possible signals of interest from background and noise;

forming a covariance matrix having elements corresponding to a cross-product between the received signal from a first antenna element and a second antenna element;

averaging a plurality of covariance matrices over a time period equal to or greater than a time over which the signals decorrelate;

performing an eigen-analysis decomposition of the time averaged covariance matrices;

forming a noise eigenvector matrix, $[e_N]$;

forming a scalar variable F, where F is given by $$F(\theta_j) = [a(\theta_j)]^T [e_N][e_N]^T [a(\theta_j)]$$

where $[a(\theta_j)]$ is a vector describing a response of the antenna elements used to acquire the signals as a function of bearing angle $(\theta_j)$;

determining a set of candidate bearing angles, $\theta_j$ by finding the maxima of the $F^{-1}(\theta_j)$ versus $(\theta_j)$ relationship;

determining a candidate signal amplitude corresponding to each of the maxima;

testing the candidate signal amplitudes to determine if they correspond to an actual signal, wherein the step of testing the candidate signal amplitudes further comprises rank-ordering the covariance matrix eigen-values and testing if a ratio between the largest eigen-value and the M'th eigen-value exceeds a predetermined level, where M is the number of candidate signal amplitudes;

rank-ordering the candidate signal amplitudes and testing if a ratio between the largest amplitude and the M'th amplitude exceeds a second predetermined level less than the first predetermined level; and determining if the product of the diagonal elements of the covariance matrix exceeds products involving the off-diagonal elements by a third predetermined level;

and determining an angle of arrival of the signals corresponding to the candidate signal amplitudes when they correspond to an actual signal.

2. The method of claim 1, wherein the first predetermined level is 20:1, the second predetermined level is 10:1, and the third predetermined level is 3:1.

3. A radar system, comprising:

an antenna having a plurality of antenna elements;

a transmitter operating at radar wavelengths;

a receiver operating at the transmitted wavelength; and a signal processor operable to process a plurality of received signals, each of the plurality of signals representing a random variable that decorrelates over angle and time with respect to the others of the plurality of signals, the signal processor operable to determine an angle of arrival of each of the plurality of received signals using a direction finding method, wherein the signal processor further comprises means for converting each of the plurality of signals to a time series for each of a plurality of range cells;

means for doppler processing the converted signals;

means for processing the doppler processed signals to segregate possible signals of interest from background and noise;

means for forming a covariance matrix having elements corresponding to a cross-product between the received signal from a first one of the plurality of antenna elements and a second one of the plurality of antenna elements;

means for averaging a plurality of covariance matrices over a time period equal to or greater than a time over which the signals decorrelate;

means for performing an eigen-analysis decomposition of the time averaged covariance matrices;

means for forming a noise eigenvector matrix, $[e_N]$ means for forming a scalar variable F, where F is given by $$F(\theta_j) = [a(\theta_j)]^T [e_N][e_N]^T [a(\theta_j)]$$

where $[a(\theta_j)]$ is a vector describing a response of the antenna elements used to acquire the signals as a function of bearing angle $(\theta_j)$;

means for determining a set of candidate bearing angles, $\theta'_j$ by finding the maxima of the $F^{-1}(\theta_j)$ versus $(\theta_j)$ relationship;

means for determining a candidate signal amplitude corresponding to each of the maxima;

means for testing the candidates signal amplitudes to determine if they correspond to an actual signal; and means for determining an angle of arrival of the signals corresponding to the candidate signal amplitudes when they correspond to an actual signal.

4. The radar system of claim 3, wherein the plurality of antenna elements further comprise:

two crossed single-turn air-loops; and a monopole, wherein the plurality of antenna elements are all mounted along the same axis.

5. The radar system of claim 3, wherein the transmitter and receiver operate in a radar band selected from a group consisting of MF, HF, and VHF.

6. The radar system of claim 3, wherein the means for testing the candidate signal amplitudes further comprises:

means for rank-ordering the covariance matrix eigenvalues and testing if a ratio between the largest eigenvalue and the M'th eigenvalue exceeds a predetermined level, where M', is the number of candidate signal amplitudes;

means for rank-ordering the candidate signal amplitudes and testing if a ratio between the largest amplitude and the M'th amplitude exceeds a second predetermined level less than the first predetermined level; and means for determining if the product of the diagonal elements of the covariance matrix exceeds products involving the off-diagonal elements by a third predetermined level.

7. A method of processing sea-echo radar data to determine the angles of arrival corresponding to a plurality of received sea echo signals, comprising:

acquiring the plurality of sea echo signals, each of the plurality of signals representing a random variable that decorrelates over angle and time with respect to the others of the plurality of signals;

converting each of the plurality of signals to a time series for each of a plurality of range cells;

doppler processing the converted signals;

processing the doppler processed signals to segregate possible sea echo signals from background and noise;

forming a covariance matrix having elements corresponding to a cross-product between the received signal from a first antenna element and a second antenna element;

averaging a plurality of covariance matrices over a time period equal to or greater than a time over which the sea echo signals decorrelate;

performing an eigen-analysis decomposition of the time averaged covariance matrices;

forming a noise eigenvector matrix, $[e_N]$;

forming a scalar variable F, where F is given by $$F(\theta_j) = [a(\theta_j)]^T [e_N][e_N]^T [a(\theta_j)]$$

where $[a(\theta_j)]$ is a vector describing a response of the antenna elements used to acquire the signals as a function of bearing angle $(\theta_j)$;

determining a set of candidate bearing angles, $\theta'_j$ by finding the maxima of the $F^{-1}(\theta_j)$ versus $(\theta_j)$ relationship;

determining a candidate signal amplitude corresponding to each of the maxima;

testing the candidate signal amplitudes to determine if they correspond to an actual sea echo signal; and determining an angle of arrival of the sea echo signals corresponding to the candidate signal amplitudes when they correspond to an actual sea echo signal.

8. The method of claim 7, wherein the step of testing the candidate signal amplitudes further comprises:

rank-ordering the covariance matrix eigen-values and testing if a ratio between the largest eigen-value and the M'th eigen-value exceeds a predetermined level, where M, is the number of candidate signal amplitudes; and rank-ordering the candidate signal amplitudes and testing if a ratio between the largest amplitude and the M'th amplitude exceeds a second predetermined level less than the first predetermined level.

9. The method of claim 8, wherein the step of testing the candidate signal amplitudes to determine if they correspond to an actual signal further comprises:

determining if the product of the diagonal elements of the covariance matrix exceeds products involving the off-diagonal elements by a third predetermined level.

10. The method of claim 9, wherein the first predetermined level is 20:1, the second predetermined level is 10:1, and the third predetermined level is 3:1.

11. The method of claim 7, wherein the step of doppler processing the converted signals further comprises:

doppler processing a set of the converted signals which extend over a time period which is selected so that the sea echo radar data decorrelates between two consecutive sets of the converted signals.

\* \* \* \* \*

UNITED STATES PATENT AND TRADEMARK OFFICE
CERTIFICATE OF CORRECTION

PATENT NO. : 5,990,834

DATED : November 23, 1999

INVENTOR(S) : Donald E. Barrick, et al.

It is certified that error appears in the above-identified patent and that said Letters Patent is hereby corrected as shown below:

Column 1, line 19, change "them" to --these--.

Column 1, line 33, change "less" to --lower--.

Column 6, line 60, delete "the".

Column 6, line 60, after "figure" insert --1--.

Column 8, line 48, after "arguable" insert --,--.

Column 11, lines 19 and 20, delete "test are used and" and insert --tests are used, each of which--.

UNITED STATES PATENT AND TRADEMARK OFFICE
CERTIFICATE OF CORRECTION

PATENT NO. : 5,990,834

DATED : November 23, 1999

INVENTOR(S) : Donald E. Barrick, et al.

It is certified that error appears in the above-identified patent and that said Letters Patent is hereby corrected as shown below:

Column 12, lines 23 and 24, delete "when more radials" and insert --because more radial velocity points--.

Column 13, line 33, change "sea echo" to --sea-echo--.

Signed and Sealed this

Eighth Day of August, 2000

Attest:

Attesting Officer

Q. TODD DICKINSON

Director of Patents and Trademarks